United States Patent
Savoie et al.

(10) Patent No.: US 11,172,144 B2
(45) Date of Patent: Nov. 9, 2021

(54) SYSTEM AND METHOD FOR CONTROLLING LUMINANCE DURING VIDEO PRODUCTION AND BROADCAST

(71) Applicant: GRASS VALLEY CANADA, Montreal (CA)

(72) Inventors: Charles Savoie, Montreal (CA); Vincent Trussart, Montreal (CA)

(73) Assignee: GRASS VALLEY CANADA, Montreal (CA)

(*) Notice: Subject to any disclaimer, the term of this patent is extended or adjusted under 35 U.S.C. 154(b) by 35 days.

(21) Appl. No.: 16/276,300

(22) Filed: Feb. 14, 2019

(65) Prior Publication Data
US 2019/0253637 A1  Aug. 15, 2019

Related U.S. Application Data

(60) Provisional application No. 62/631,397, filed on Feb. 15, 2018.

(51) Int. Cl.
*H04N 9/68* (2006.01)
*H04N 5/243* (2006.01)
(Continued)

(52) U.S. Cl.
CPC .......... *H04N 5/243* (2013.01); *G06T 5/009* (2013.01); *H04N 5/20* (2013.01); *H04N 5/2228* (2013.01);
(Continued)

(58) Field of Classification Search
CPC ........ H04N 5/243; H04N 5/20; H04N 5/2228; H04N 21/4223; H04N 21/44; G06T 5/009
(Continued)

(56) References Cited

U.S. PATENT DOCUMENTS

| 8,570,394 B1* | 10/2013 | Maeng | G06T 5/40 |
| | | | 348/222.1 |
| 2009/0160987 A1* | 6/2009 | Bechtel | H04N 5/353 |
| | | | 348/302 |
| 2016/0381363 A1 | 12/2016 | Tao et al. | |

FOREIGN PATENT DOCUMENTS

EP    3142002 A1    3/2017

OTHER PUBLICATIONS

International Search Report & Written Opinion issued in PCT/EP2019/053892 dated May 15, 2019.
(Continued)

*Primary Examiner* — Usman A Khan
(74) *Attorney, Agent, or Firm* — Arent Fox LLP

(57) ABSTRACT

Disclosed herein are systems and methods for controlling luminance during video production and broadcast. An exemplary system includes a camera to capture video content in a first imaging range, a histogram calculator to evaluate luminance in each pixel in the captured video content, and to generate a luminance histogram for the captured video content, a user interface generator that generates a user interface displaying the video content overlaid with the luminance histogram and generates a user interface displaying a light intensity curve and adjustable parameters for converting the first range into a second range, a luminance controller to convert luminance of the video content into the second imaging range based on the light intensity curve, and a broadcast controller to encode the video content with the second imaging range into broadcast range for transmitting to one or more endpoint devices.

25 Claims, 7 Drawing Sheets

(51) Int. Cl.
    *H04N 21/4223*     (2011.01)
    *H04N 21/44*     (2011.01)
    *H04N 5/20*     (2006.01)
    *G06T 5/00*     (2006.01)
    *H04N 5/222*     (2006.01)

(52) U.S. Cl.
    CPC ......... *H04N 21/4223* (2013.01); *H04N 21/44* (2013.01)

(58) Field of Classification Search
    USPC ....................................................... 348/234
    See application file for complete search history.

(56) References Cited

OTHER PUBLICATIONS

Baselight Editions, FilmLight, "Baselight for Avid," http://www.mediaonline-ffm.de/filed/theme_files/downloads/BaselightAvid.pdf, XP055585317, Jan. 1, 2013.

* cited by examiner

SYSTEM AND METHOD FOR CONTROLLING LUMINANCE DURING VIDEO PRODUCTION AND BROADCAST

CROSS-REFERENCE TO RELATED APPLICATIONS

This application claims priority to U.S. Provisional Application No. 62/631,397, filed on Feb. 15, 2018, the content of which is herein incorporated by reference in its entirety.

FIELD

The present disclosure generally relates to an apparatus that assists in content conversion in video production, and particularly to a system and method for controlling luminance during video production and broadcast.

BACKGROUND

High Dynamic Range ("HDR") is a relatively new technology being introduced by a number of standard organizations, such as Blu-ray Disc Association, ISO/IEC HEVC, ITU-R, SMPTE, CEA, and HDMI, as well as private companies, such Dolby and Philips. HDR displays provide a significant improvement over current display technology, such Standard Dynamic Range ("SDR") displays and monitors. In particular, HDR devices produce a peak brightness that is an order of magnitude larger than SDR technology and a dynamic range that approaches the capabilities of a human observer. Additionally, these devices provide an enlarged color gamut and can reduce the motion blur in LCD systems, for example.

Current SDR devices do not support HDR content as such SDR devices are designed for current display technology and built on the assumption that HDR content cannot be reproduced. Accordingly, in the current video consumption environment, there is a need to convert content from HDR to SDR in order to enable content playback on such SDR devices. This conversion from HDR to SDR will be a key technology while the new HDR-capable display monitors and televisions begin to penetrate the mainstream consumer market in the United States and the rest of the world.

HDR to SDR conversion will be a particularly critical technology in the video production and broadcast environment, and, specifically, for live video production and distribution. Currently, video production cameras used to capture live content are typically HDR enabled cameras. Moreover, camera shading operators located at the live event can manually adjust the camera settings during content capture to account for brightness levels in view of the downstream HDR to SDR conversion that will be performed to enable quality playout of the captured content on the video consuming end-devices, such as SDR-capable display monitors and televisions. However, despite camera shading operators' ability to account for brightness levels for video content capture, a system and method is needed to facilitate and enhance the HDR to SDR conversion for live video production and video content broadcast.

SUMMARY

Thus, according to an exemplary aspect, a video production system is disclosed that includes one or more user interfaces for displaying content and user controls for managing the HDR to SDR conversion process for video distribution and broadcast.

In general, the system includes at least one, and more likely a plurality of HDR enabled cameras, located at a live event and provided for content capture. The HDR content will then be encoded and streamed to a production environment, such as a production truck or video production center, where the HDR content will be processed before video distribution and broadcast. In one aspect, the video content distribution signal will comprise a simulcast signal in which one channel distributes/broadcasts the content in HDR while a second channel distributes/broadcasts the content in SDR. In another aspect, the broadcasted signal will be a unicast signal in SDR (converted from the captured HDR content). The mechanisms for content distribution are not critical to the system and method disclosed herein and will not be described in detail.

In an exemplary aspect, the video production system provides two user interfaces that enable the camera shading operator (or similar video production user/operator) to manage and control the intensity of the captured content for the HDR to SDR conversion. More particularly, a first user interface (e.g., a content zone selection and histogram generation interface) enables the user to select a zone or region (e.g., a defined rectangular zone and referred to as a "snapshot") of the captured content to generate a histogram (i.e., a "nits histogram") that measures the nits levels of the selected region of the captured content. It is noted that a "nit" is a unit of luminance equivalent to one candela per square meter. Thus, in this aspect, this first interface enables the user to select and modify the zone/region of the captured content that is received to calculate the nits histogram (e.g., a measured luminance level histogram) of the captured HDR content.

The second interface (e.g., a light intensity curve adjustment interface) enables the operator to visualize the algorithm's parameter's effect on the tone mapping function and the snapshot area. The second interface is configured such that the operator (e.g., the camera shading operator) can manually adjust the intensity curve (e.g., a Bézier curve) based on a plurality of displayed parameters to control the HDR to SDR conversion. It is noted that the term "tone mapping" refers to the technique for the video processing described herein for mapping one set of colors (i.e., the HDR content) to another set of colors (i.e., the SDR content) to approximate the appearance of the HDR images in the video consumption devices, i.e., the SDR-capable display monitors and televisions that have a more limited dynamic range as described above.

In accordance with an exemplary embodiment, a system is provided for controlling luminance of video content during video production. In this embodiment, the system includes at least one camera configured to captured video content in a first imaging range; an analysis region selector configured to select at least one region in at least one frame of the captured video content, the selected at least one region comprising a plurality of pixels; a pixel luminance evaluator configured to measure a respective luminance level for each of the plurality of pixels in the selected at least one region in the at least one frame of the captured video content; a luminance histogram generator configured to generate luminance histogram based on the measured luminance levels of the plurality of pixels in the selected at least one region; and a first user interface configured to display at least one frame of the captured video content and the generated luminance histogram as an overlay on the displayed at least one frame. In addition, the exemplary system further includes a second user interface configured to display a light intensity curve relative to a plurality of adaptive parameters defined based on the luminance values of the generated luminance histogram; a luminance controller configured to convert the captured video content in the first imaging range to broadcast video content in a second imaging range, different than the first image range and having a luminance based on output luminance values of the light intensity curve; and a video content distribution controller configured to encode the broadcast video content in the second imaging range for distribution to at least one end consuming device for display thereon.

Moreover, in a refinement of the exemplary embodiment, the first imaging range is a high dynamic range and the second imaging range is a standard dynamic range and the captured video content is live video content. Furthermore, in an exemplary aspect, the adaptive parameters displayed in the second user interface include an SDR reference range, an SDR peak white, a tonemap Max-Destination, a tonemap HDR range, and an HLG monitor. Yet further, the analysis region selector can include at least one first control input configured to receive an operator input to select a size and a position of the at least one region in the at least one frame of the captured video content. Moreover, the second user interface can include at least one second control input configured adjust a position of the light intensity curve relative to the plurality of adaptive parameters to set the output luminance values for the luminance controller to convert the captured video content in the first imaging range to broadcast video content in the second imaging range.

In accordance with another exemplary embodiment, a system is provided for controlling luminance of video content during video production, the system comprising, at least one camera configured to capture video content in a first imaging range, a histogram calculator configured to evaluate luminance in the captured video content, and generate a luminance histogram for the captured video content, a user interface generator configured to: generate a first user interface displaying the captured video content overlaid with the generated luminance histogram, and generate a second user interface displaying a light intensity curve configured with parameters for converting the capture video content from the first imaging range into a second imaging range; and a luminance controller configured to convert the captured video content into the second imaging range based on the parameters of the light intensity curve.

In accordance with yet another exemplary embodiment, a system is provided for setting luminance of video content, the system comprising: a histogram generator configured to generate a luminance histogram based on measured luminance values for at least one region in video content in a first imaging range, a user interface generator configured to generate at least one user interface configured to display the generated luminance histogram a light intensity curve with parameters for converting the video content from the first imaging range to a second imaging range and a luminance controller configured to convert the video content to the second imaging range based on settings of the parameters of the light intensity curve.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplary pointed out in the claims.

DETAILED DESCRIPTION

Figure 1:
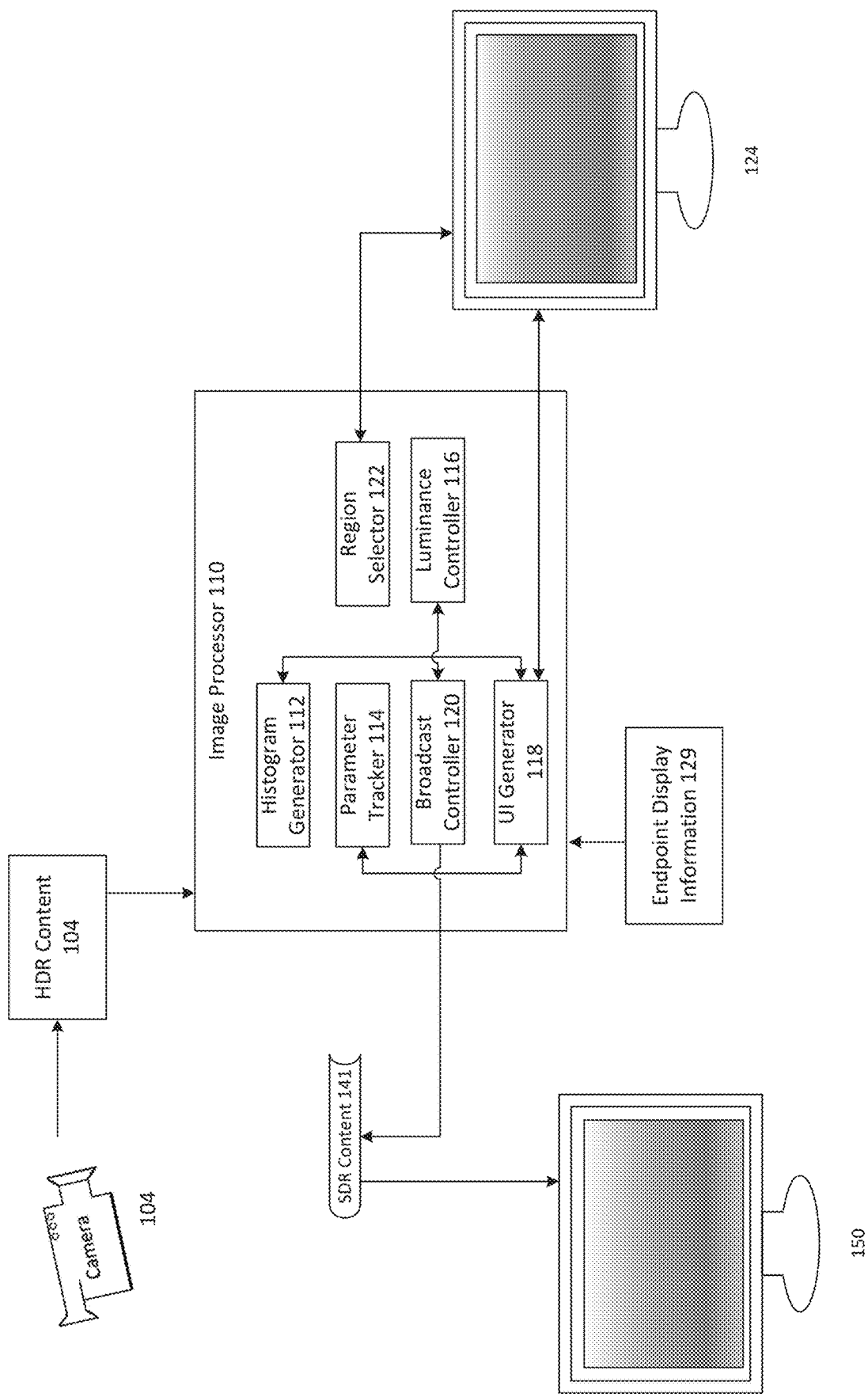
FIG. 1 is a block diagram of a system for generating SDR video content from HDR video content in accordance with an exemplary embodiment.

Various aspects of the disclosure are now described with reference to the drawings, wherein like reference numerals are used to refer to like elements throughout. In the following description, for purposes of explanation, numerous specific details are set forth in order to promote a thorough understanding of one or more aspects of the disclosure. It may be evident in some or all instances, however, that any aspects described below can be practiced without adopting the specific design details described below. In other instances, well-known structures and devices are shown in block diagram form in order to facilitate description of one or more aspects. The following presents a simplified summary of one or more aspects of the disclosure in order to provide a basic understanding thereof.

FIG. 1 is a block diagram of a system 100 for generating SDR video content from HDR video content in accordance with exemplary embodiments of the present disclosure. As shown, the system 100 comprises an image capture device 102 (e.g., a camera), an image processor 110, an operator display 124 and one or more endpoint displays 150 (e.g., content consuming devices, such as a computer or television, for example).

The capture device 102 is configured to capture HDR video content 104 and delivers the video content to the image processor 110. The HDR content 104 is processed by the image processor 110 that ultimately generates SDR content 141 for output to the one or more endpoint devices (e.g., SDR displays) such as device 140. The image processor 110 generates a user interface for an operator that allows the operator to adjust the conversion from HDR to SDR dynamically during live or video content broadcasts. In some aspects, the generated user interfaces are partially based on endpoint device display information 129. In order to adequately generate the SDR content 141, the image processor receives adjustments by the operator and adjusts the generation process accordingly, specifically targeting a luminance curve of the generated content. It should be appreciated that HDR to SDR conversion are described as the exemplary imaging ranges, but it is contemplated that the disclosed invention can be used to convent image content between different types of content.

In exemplary aspects, the image processor 110 comprises a histogram generator 112, a parameter tracker 114, a luminance controller 116, a user interface (UI) generator 118, a broadcast controller 120 and a region selector 122. The image processor 110 receives the HDR content 104 as content is being broadcast live or at a later time.

Figure 3:
FIG. 3 illustrates an exemplary user interface for generating SDR video content from HDR video content in accordance with an exemplary embodiment.

Initially, the UI generator 118 is configured to generate a user interface 130 shown in FIG. 3 to display on an operator display 124. In the UI 130, the operator is presented one or more frames of the HDR content 104. Using the UI 130, the operator can select one or more regions of the frame, e.g., region 300, by using a mouse or touchscreen for example, with the region 300 representing a variation in the luminance that the operator wishes to preserve in an SDR conversion of the HDR content 104. The region selector 122 is configured to capture this region and transfer control to the histogram generator 112.

Figure 2:
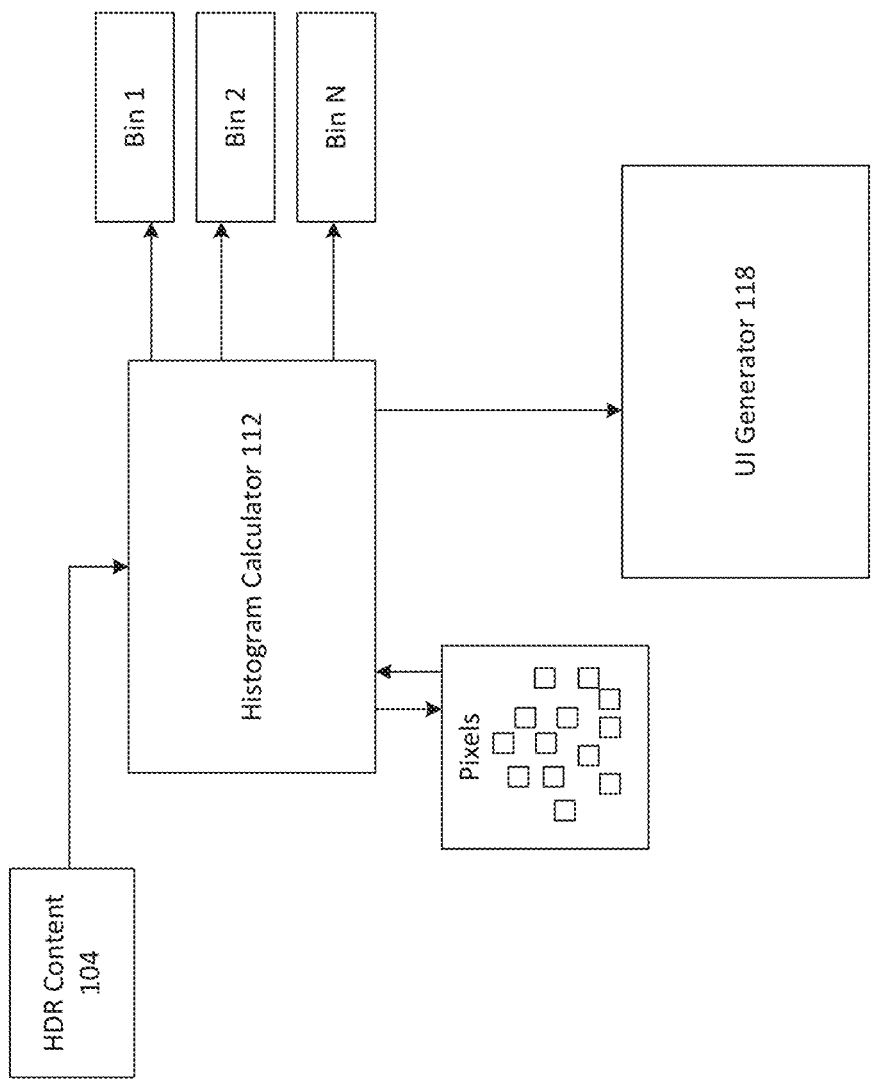
FIG. 2 illustrates a block diagram of the histogram calculator for generating SDR video content from HDR video content in accordance with an exemplary embodiment.
Figure 4:
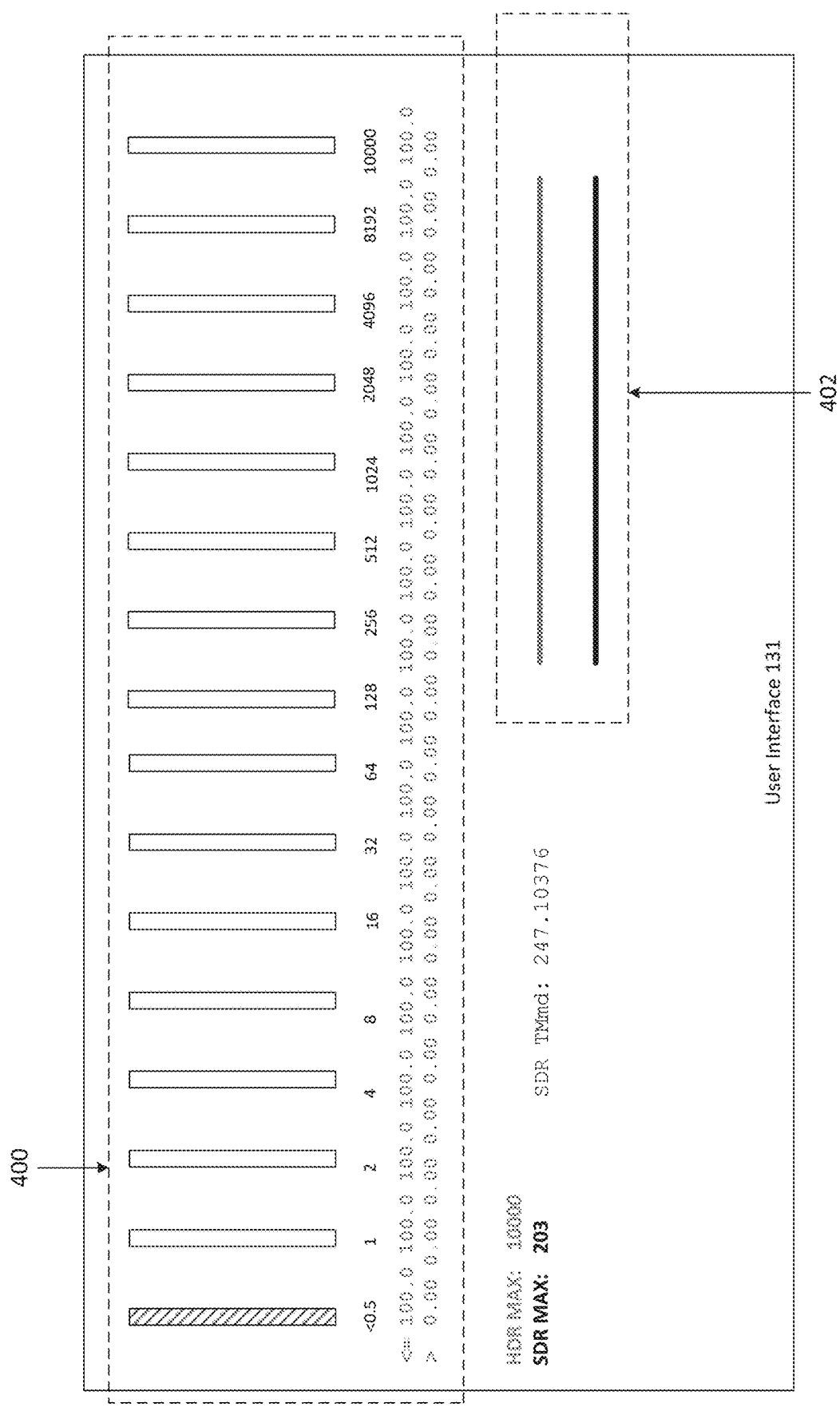
FIG. 4 illustrates an exemplary histogram for generating SDR video content from HDR video content in accordance with an exemplary embodiment.

Once this region is selected, the histogram generator 112 is configured to evaluate the light intensity of each pixel contained with the selected region 300, and generate a histogram of the light intensity in each of the pixels. For example, FIG. 2 illustrates a block diagram of the histogram calculator that receives HDR content 104, and based on the luminance in each pixel, sorts the pixels into bins 1 to N. The bins 1-N are used by the UI generator 118 in the generation of the user interfaces 130-132. In an exemplary aspect, the calculated histogram 400, as shown in FIG. 4, is overlaid on the content being currently processed by the image processor 110. It is noted that the content has been omitted from FIG. 4 for the sake of clarity. The histogram 400 shown in FIG. 4 is, for example, a histogram of a frame containing pixels that are mostly black or near black.

Figure 5:
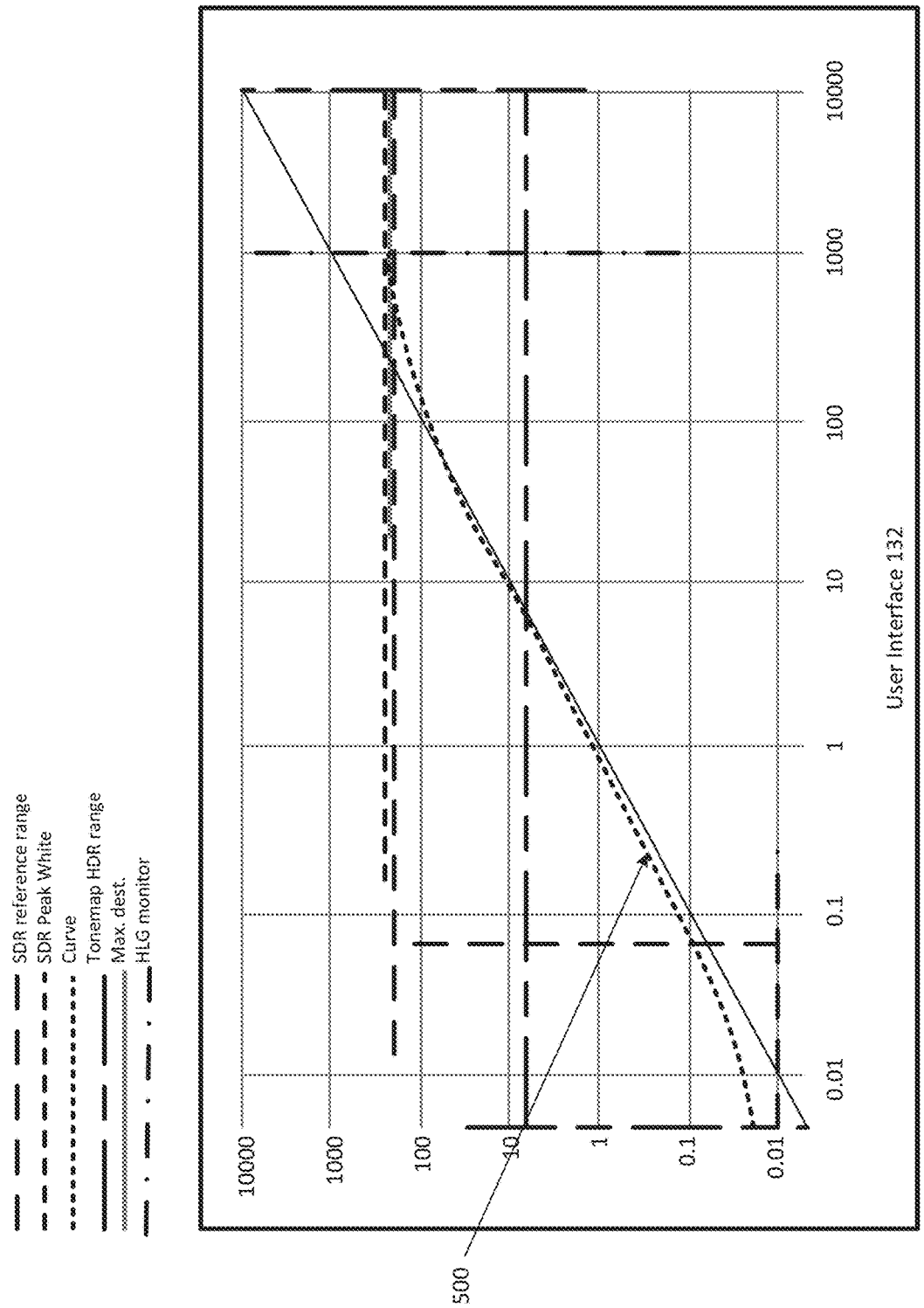
FIG. 5 illustrates another exemplary user interface for generating SDR video content from HDR video content in accordance with an exemplary embodiment.

The UI generator 118 is also configured to generate a user interface 132, shown in FIG. 5, for the conversion of the imaging content (e.g., HDR content) from its first imaging range to a second imaging range (e.g., SDR). The parameter tracker 114 is configured to capture changes made to various parameters adjustable by the operator in the user interface 132. In some aspects, these parameters include "HDR MAX", "SDR MAX", "SDR TMmd", "SDR reference range", "SDR peak white", "Max. Dest.", "tonemap HDR range" and "HLG monitor", though other parameters are also contemplated herein. These parameters will be discussed in further detail below. In exemplary aspects, the operator may adjust these parameters via controls on the display 124, touch screen, or any other type of input device. As the operator adjusts the parameters, the light intensity curve 500 is generated. The light intensity curve 500 dictates the conversion from the light intensity range of the HDR content 104 to a second light intensity range that will be used in the SDR content 141 to maintain adequate light levels in endpoint devices.

Once the parameters are adjusted by the operator, the luminance controller 116 is configured to apply the changes to the HDR content 104 to generate SDR content based on the light intensity curve 500. Finally, the broadcast controller 120 encodes the generated SDR content, partially according to the endpoint display information 129 and transmits the SDR content 141 to endpoint devices such as display 150.

FIG. 4 illustrates the luminance histogram 400 according to an exemplary embodiment.

It is noted that the exemplary luminance histogram shown in FIG. 4 corresponds to an image with a black background, in order to adequately describe the display of the histogram 400 for purposes of this disclosure. However, according to an exemplary aspect, the calculated histogram 400 and adaptive parameter user interface 132 may be presented as an overlay on top of portions of the captured content 104. In other words, the system 100 can include a video monitor (in the production truck, for example display 124) that displays the captured HDR content 104 and generates the luminance histogram 400 that is overlaid on the captured content to provide the user interface 132.

According to the exemplary aspect, the user interface 131 is configured to generate and display the luminance histogram 400, which displays the proportion of pixels in each luminance range. As shown above, in the exemplary aspect, the luminance histogram 400 includes 16 separate luminance ranges with the first range beginning at less than 0.5 nits (i.e., "<0.5" nits) and the last range being for pixels in the 8192-10000 nits range (i.e., "10000" nits). Thus, as shown, the luminance histogram 400 includes 16 separate "bins" for displaying the luminance of pixels in each range.

According to the exemplary aspect, the system 100 includes a luminance histogram generator 112 (which can be a software module executed by a computer processor) that is configured to calculate the nits histogram by precomputing a 1D LUT (i.e., a one dimensional lookup table) where the key is X bits, a sum of n, m and o, where n is msb (most significant bits) of Y', m is msb (most significant bits) of Cb', o is msb (most significant bits) of Cr'. The LUT value is the NITs for that key X. In this aspect, n, m, and o are numeric values corresponding to the number of bits of the pixel's Y', Cb' and Cr' components (respectively) that contribute to the LUT key. The histogram generator 112 also generates the histogram for use in the user interface 131. For each analyzed pixel, the LUT directly generates a bin index (or luminance range), and the histograms bin's counter is incremented accordingly.

In one exemplary aspect, a predefined limit can be selected to show the percentage of pixels that fall into a particular luminance range. For example, if 40% (as an exemplary predetermined limit) of pixels fall into a particular luminance range, that histogram bin will be shown to have a full bar. For example, in the example of FIG. 4, since the histogram 400 represents a black image, every pixel will have a nits value of less than 0.5. Therefore, since the percentage of pixels is greater than 40% (i.e., it is 100% in this example), the <0.5 nits bin is shown to have a full bar. It should be appreciated that when an actual image of captured content 104 is analyzed to calculate the histogram, each bin will have varying levels based on the actual pixels that fall within each luminance range.

As further shown, the user interface 131 is configured to derive and display adaptive parameters that enable the operator to control highlights and midtones separately. Specifically, in the exemplary aspect, these parameters includes "SDR Max" and "HDR Max". The HDR Max parameter is a parameter value that drives the conversion from SDR to HDR. The HDR Max parameter affects highlight compression, trading off luminance of the brightest pixel in an image for greater detail in the brightest parts of the image. In adaptive mode, analysis of the captured image may drive changes to HDR Max. If this value is low then, then the production system will perform less highlight compression to preserve highlight granularity. Moreover, the SDR Max is the Max SDR value, which indicates where to map the SDR diffuse white point. In an exemplary aspect, proper control of this SDR Max parameter is a key factor in controlling the image conversion, i.e., the system 100 ensures that most of the pixels in the captured image are below the diffuse white point. In the exemplary aspect shown in FIG. 4, the SDR Max value is set to 203 nits and is configured to be increased if the weighted average of the histogram bins goes above this value. Furthermore, the parameter "SDR TMmd" indicates the SDR Tone Mapping max-destination. It should be appreciated that each of the parameter terms illustrate in FIG. 4 are selected for an operator's perspective to represent parameters of the source image and capabilities of the target display.

Moreover, the user interface is configured to display a parameter tracker, which in the exemplary aspect is provided as graphs 402 in the lower right of the interface 131. In the example of FIG. 4, the two lines on the lower right are trackers for the HDR Max and SDR Max parameters and graph the recent values of these two parameters. In this example, the parameter trackers are shown as flat or horizontal lines, which indicates that the parameter have not recently been changed in the captured frames of the HDR content. In operation, the parameters will change upon each scene change, frame change, etc.

As noted above, the first user interface 130 is configured to enable the operator to select a snapshot (i.e., a region or zone) that is used for the histogram calculation. In some exemplary aspects, the first user interface 130 may be combined with the user interface 131, allowing the operator to select the snapshot (the one or more regions to be analyzed) as the histogram is concurrently displayed. In this aspect, the histogram will change as the operator's selection changes.

As shown in FIG. 3, the user interface 130 provides an image with a selected region 300 that can be used to calculate the luminance histogram. Those of ordinary skill in the art will recognize that while an exemplary aspect of the present disclosure region selection can be performed on portions of an image. However, in another exemplary aspect, the histogram is calculated for the entire frame as opposed to a selected region. In one aspect, to select a region, the monitor can include one or a plurality of knobs that enable the operator to select the size and position of the snapshot. For example, a first knob enables the user to zoom in or out in a particular region thereby adjusting the size of the selected region. A second knob enables the operator to adjust the position (e.g., moving a cross point according to the X and Y position within the image). By doing so, the operator can select the particular region of the image, and, more particularly, the pixels within the defined region, such that the luminance values for each pixel within the region are used to calculate the nits values for the luminance histogram, which is then presented as an overlay as described above with respect to FIG. 1. Advantageously, by enabling the operator to define the particular region with the captured HDR content, the operator can effectively select regions of the image that may most significantly affect the luminance when the HDR content is converted to SDR format for content distribution as discussed above.

Moreover, it is noted that while the exemplary aspect describes the user operating inputs as knobs configured to control the size and position of the luminance histogram region, the size and position can be adjusted according to other possible user inputs. For example, the user interface 130 can be provided on a touchscreen with the user being able to define and adjust the region or zone directly with touch inputs on the screen as would be appreciated by one skilled in the art. Moreover, in an exemplary embodiment, the default setting is that the histogram is generated for the entire frame and that no specific region is selected.

In either case and as further described above, a second interface 132 (e.g., a light intensity curve adjustment interface) can also be provided to an operator (e.g., the camera shading operator) in the production environment on display 124, which enables the operator to adjust the intensity curve 500 (also referred to as a tone mapping curve) with relation to parameter values that are defined according to the luminance histogram created for the captured HDR content, as described above.

FIG. 5 illustrates a screenshot of the user interface 132 according to an exemplary aspect.

In general, the exemplary system and method described herein is configured to perform an HDR to SDR tone mapping algorithm for the conversion and video content production process. In general, the HDR to SDR tone mapping performs color conversion and HDR to SDR tone mapping. Moreover, this conversion must balance the preservation of artistic intent with the technical limitations of SDR and Rec-709 color space, for example. Advantageously, the tone mapping algorithm utilizes parameters that will automatically control the trade-off between preserving detail in very bright areas of the HDR content and preserving an appropriate level for middle and dark tones to ensure that the SDR video production has acceptable levels of illumination and contrast from an end user perspective.

According to the exemplary aspect shown in FIG. 5, the tone mapping curve 500 (e.g., a Bézier curve) is generated and displayed, enabling the operator to visualize the algorithm's parameters' effect on the tone mapping function and the region 300 shown in FIG. 3 (i.e., the selected luminance region of the HDR content as discussed above). In this aspect, the X axis is the input luminance (i.e., the luminance of the HDR content) and the Y axis is output luminance (i.e., the luminance of the SDR content).

Moreover, the exemplary light intensity curve adjustment interface (i.e., second user interface 132) generates a plurality of parameter values that enable the operator to fit the tone mapping curve for the SDR conversion. As shown, the parameter values include: "SDR reference range", "SDR peak white", "Max. dest."; "Tonemap HDR Range"; and "HLG Monitor". It is noted the each of the initial conditions for the parameter values are set by the capabilities of the target monitor as received in the endpoint display information 129, the luminance encoding or transfer characteristics of the source data, and the measured results of the frame, or video block, being analyzed for mapping.

According to the exemplary aspect, the parameters shown in this user interface 132 are adjusted based on the luminance values of the selected region 300 of the HDR image, which are represented by the luminance histogram 400 as described above. For exemplary purposes, four methodologies are provided, which include: (1) High Mid-tone Detail Enhancement; (2) Highlight Detection; (3) Strong Highlight Enhancement; and (4) Gamut excursion correction. In some aspects of the disclosure, the user interface 132 may include graphical elements for adjusting each of the adjustable parameters, and for selecting one or more of these methodologies. The operator may select one or more of these methodologies in the user interface 132 using the graphical element, or, for example a physical knob, or the like, and the adjustable parameters may automatically be adjusted to values that produce a light intensity curve based on the selected or disabled methodologies.

In an exemplary aspect, High Mid-tone Detail Enhancement involves raising the SDR peak white value shown in FIG. 5. For example, if analysis of the luminance histogram 400 indicates a large portion (e.g., a percentage above a predetermined threshold) of midrange and low highlight pixels (e.g., between 4 and approximately 1000 nits) are highlights (e.g., >~250 nits), the system 100 is configured to raise the conversion algorithm's SDR peak white parameter value by a relative value in order to allocate enhanced resolution for these pixels.

In an exemplary aspect, Highlight Detection involves reducing the conversion algorithm's tonemap HDR Max parameter (i.e., the "Tonemap HDR range" shown in FIG. 5 above). For example, if analysis of the luminance histogram 400 indicates that very few pixels (e.g., a percentage below a predetermined threshold) are highlights (e.g., above approximately 500 nits), the system 100 is configured to reduce the conversion algorithm's tonemap HDR Max parameter in order to enhance the luminance of pixels that ordinarily would be white or near-white on an SDR display, but would otherwise be reduced in intensity to illustrate even brighter pixels in the SDR signal.

In an exemplary aspect, Strong Highlight Enhancement involves raising the conversion algorithm's tonemap HDR Max parameter (i.e., the "Tonemap HDR range" shown in FIG. 3 above) and the tonemap Max-Destination parameters (i.e., the "Max. dest." shown in FIG. 5 above). For example, if analysis of the luminance histogram 400 indicates that a significant portion (e.g., a percentage above a predetermined threshold) of pixels are very bright (e.g., luminance above 2048 nits), the system 100 is configured to raise the conversion's tonemap HDR Max parameter and Tonemap Max-Destination parameters in order to linearize the highest portion of the Bézier down-mapping curve used in the algorithm (i.e., the tone mapping curve shown in FIG. 3), which allows for more detail to emerge in the very strong highlights.

In an exemplary aspect, Gamut excursion correction involves raising the SDR Ref White parameters (i.e., the "SDR reference range" shown in FIG. 5 above). For example, for certain HDR content, a significant portion of HDR pixels (e.g., 2020 HDR pixels) are not properly expressible in the SDR 709 space, which would result in very "patchy" images with severe loss of detail. This technical effect is possible due to high luminance pixels being outside the 709 gamut. Therefore, when analysis of the luminance histogram 400 indicates that this condition existing for the captured HDR content, the system 100 is configured to lower the overall luminance by raising SDR Max, to effectively bring these out-of-gamut pixels into range and restore detail.

It is reiterated that each of these four methodologies is provided for exemplary purposes and can be derived and modified according by control operators. In other words, the specific pixel measurements that control the adjustment of the adaptive parameter display (i.e., the values: "SDR reference range", "SDR peak white" "Max. dest."; "Tonemap HDR Range"; and "HLG Monitor") can be refined and are not necessarily limited to the methodologies described above. However, it should be appreciated that the values of the bins of the luminance histogram 400 are used to control the position of these adaptive parameter displayed on the light intensity curve adjustment interface shown in FIG. 5.

As further shown in FIG. 5, the user interface 132 generates a Bézier curve that projects the hybrid log-gamma ("HLG") pixels in the HDR content that is then tone-mapped (i.e., converted) to SDR content. For example, in one aspect, the disclosed system and method uses the $IC_TC_P$ color space for the received HDR content, which is capped at 1,000 nits as shown in FIG. 5 (i.e., the vertical line of the HLG monitor). In this aspect, the down-mapping process will be more stable than conventional HDR to SDR conversion by using the YCrCb color space.

In general, it is noted that with Y, Cr, Cb, traditionally used for color video representation, luminance Y, is strongly coupled with the Color Difference components. Y, Cr, Cb was developed to provide constant Luminance, but not constant hue. ICtCp provides a way to have both constant luminance, but also lines of constant hue. The ICtCp has been defined to support the transformation of REC 2020 primaries, using both the Dolby PQ and HLG non-linear companded intensity curves. I is the black-white intensity aspect. Ct is the Color Tritan signal based on yellow blue, and Cp is the Color Protan signal, based on red-green. Mapping of RGB to the ICtCp color space is described in the Dolby White Paper on ICtCp, version 7.2, (available at www.dolby.com/us/en/technologies/dolby-vision/ictcp-white-paper.pdf), the contents of which are hereby incorporated by reference. The mapping of RGB to YCrCb is known, and as these are linear sets of equations, any can be mapped to the other. With ICtCp, the intensity can be adjusted with little impact on the color, therefore luminance histogram can be used to evaluate the best setting for intensity, and then tone mapping can occur to correct the color space. There will be some iteration, but because the effects of adjusting one or the other, are decoupled, there is little interaction. Accordingly, the disclosed system and method provides a stable solution. With YCrCb, adjustments to Y significantly change Cr or Cb, and then adjusting these would in turn be coupled to Y. As such, the process is much more circular than using a conventional color mapping system.

Moreover, according to the exemplary aspect, the user interface is provided with one or more control knobs (e.g., physical knob, touch screen interface or the like) that is configured to enable the operator to adjust the position (relative to the parameters) of the intensity curve for the down-mapping process. That is, the user interface is configured such that by using the control knob, the operator (e.g., camera shading operator) can adjust the projection/position of the Bézier curve relative to the parameter values to control the illumination levels for the SDR content. Based on the positioning of the Bézier curve as selected, the input and output luminance values are set according to the Bézier curve's positional relationship to the X and Y axes of the light intensity curve adjustment interface. Once the intensity for the SDR (i.e., the output luminance) is set by the operator, the system is further configured to perform color space mapping to generate the output video production signal in SDR format.

It should be appreciated that according to the exemplary aspect, the shape of the Bézier curve can be used to best match the end ranges of the mapping process, essentially providing a piece-wise function to transition from the linear conversion range, to the end points, in a smooth way. This piecewise function is applied to the pixel values to calculate the new mapped values, with the pixel values being represented in the ICtCp space.

Therefore, according to the exemplary aspects, the operator is advantageously provided with a plurality of user interfaces for live video production that enable the operator to more actively manage and control the HDR to SDR conversion to improve final picture quality with better picture illumination and contrast from an end consumption perspective.

Figure 6:
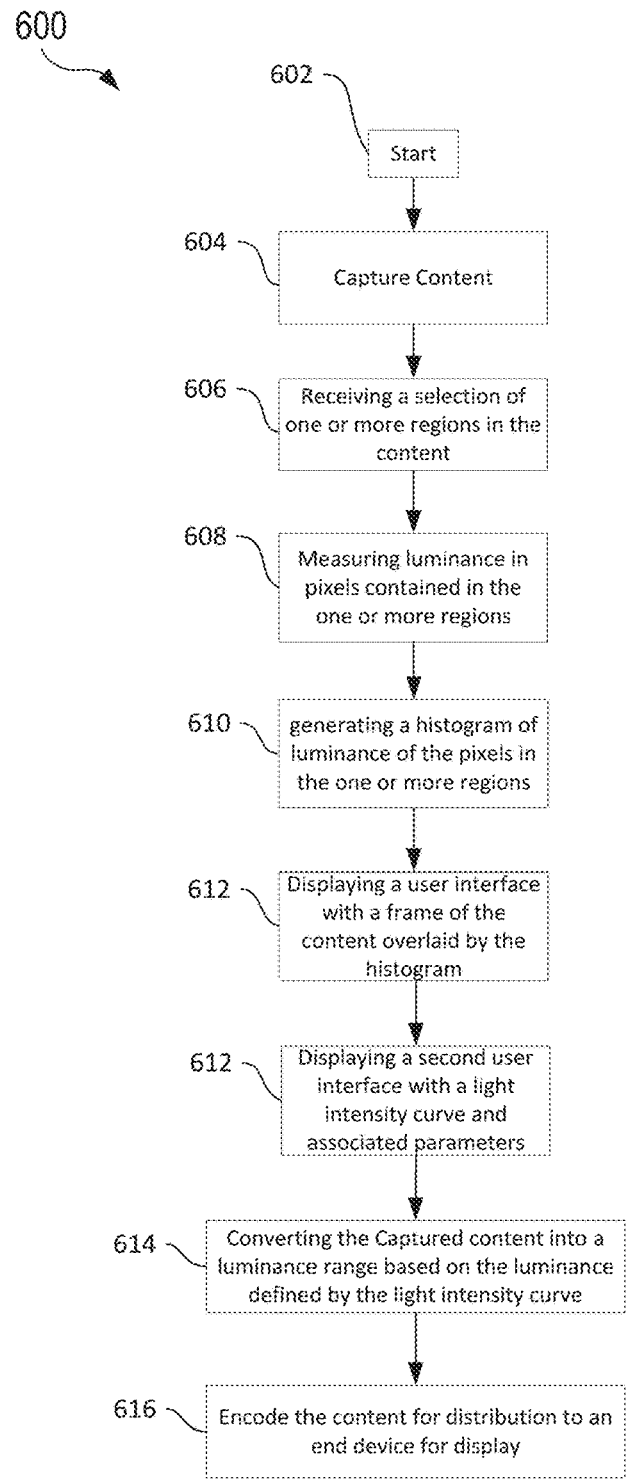
FIG. 6 illustrates a flow diagram for a method for controlling luminance during video production and broadcast, in accordance with exemplary aspects of the present disclosure.

FIG. 6 illustrates a flow diagram for a method 600 for controlling luminance during video production and broadcast, in accordance with exemplary aspects of the present disclosure.

As shown, initially at 602, the method is initiated in which an HDR video capture device such as an HDR camera captures HDR video content, e.g., video content 104 at step 604. As described above, the captured content is then provided to the image processor 110 shown in FIG. 1 for conversion into SDR content (or other desired image format).

At 606, the region selector 122 shown in FIG. 1 receives a selection of one or more regions (e.g., region 300 shown in FIG. 3) of a frame of content 104 from a user interface. In exemplary aspects, the region is selected by an operator of the system 100. In another exemplary aspect, the region may be selected automatically based on predefined user or program parameters specifying the specific region of pixels. It is again reiterated that in accordance with another exemplary embodiment, the entire frame of the content 104 is analyzed and thus step 606 is considered an optional step.

In either case, the method proceeds to 608, where the histogram generator 112 measures the luminance of each pixel contained within the region selected by the operator. In some aspects, the operator may select several regions, and the histogram generator 112 measures the luminance of the pixels in some or all of the selected regions.

The method proceeds to 610, where the histogram generator 112 generates a histogram by grouping each pixel based on light intensity into a particular bin. An example of such a histogram is shown in FIG. 4, luminance histogram 400 and described above.

At step 612, a user interface is displayed to an operator of the system 100, such as user interface 130 and 131 shown in FIGS. 3-4. The user interface may display a frame of the content overlaid with the generated histogram based on the selected region. In exemplary aspects, this user interface can be displayed as an initial step in the method, allowing a user to select a region via this interface, and dynamically regenerating the histogram each time the selection is modified.

At step 614, a user interface generator 118 displays a second user interface (e.g., user interface 132) to the operator of the system 100 that contains a light intensity curve, along with several other adjustable parameters. The first and second user interfaces may be display concurrently on a same screen according to an exemplary aspect. Moreover, the operator may adjust each of these parameters shown in the second user interface, which will then dynamically regenerate the light intensity curve based on the adjustments. As further described above, the second user interface provides the ability to convert the light intensity range of the HDR content to a range that is suitable for display on SDR endpoints, and the operator may adjust each of the parameters according to the algorithms described above.

Once the adjustments are complete, the method proceeds to step 616 where the luminance controller convers the captured content 104 into a luminance range based on the luminance defined by the light intensity curve from step 612. At 618, the converted content is encoded into SDR content (e.g., SDR content 141) and broadcast to endpoint devices, e.g., display 150. According to an exemplary aspect, the method shown in FIG. 6 may be continuously repeated as part of a loop so that the user, for example, can continuously adjust the parameters as part of a feedback loop, for example.

Figure 7:
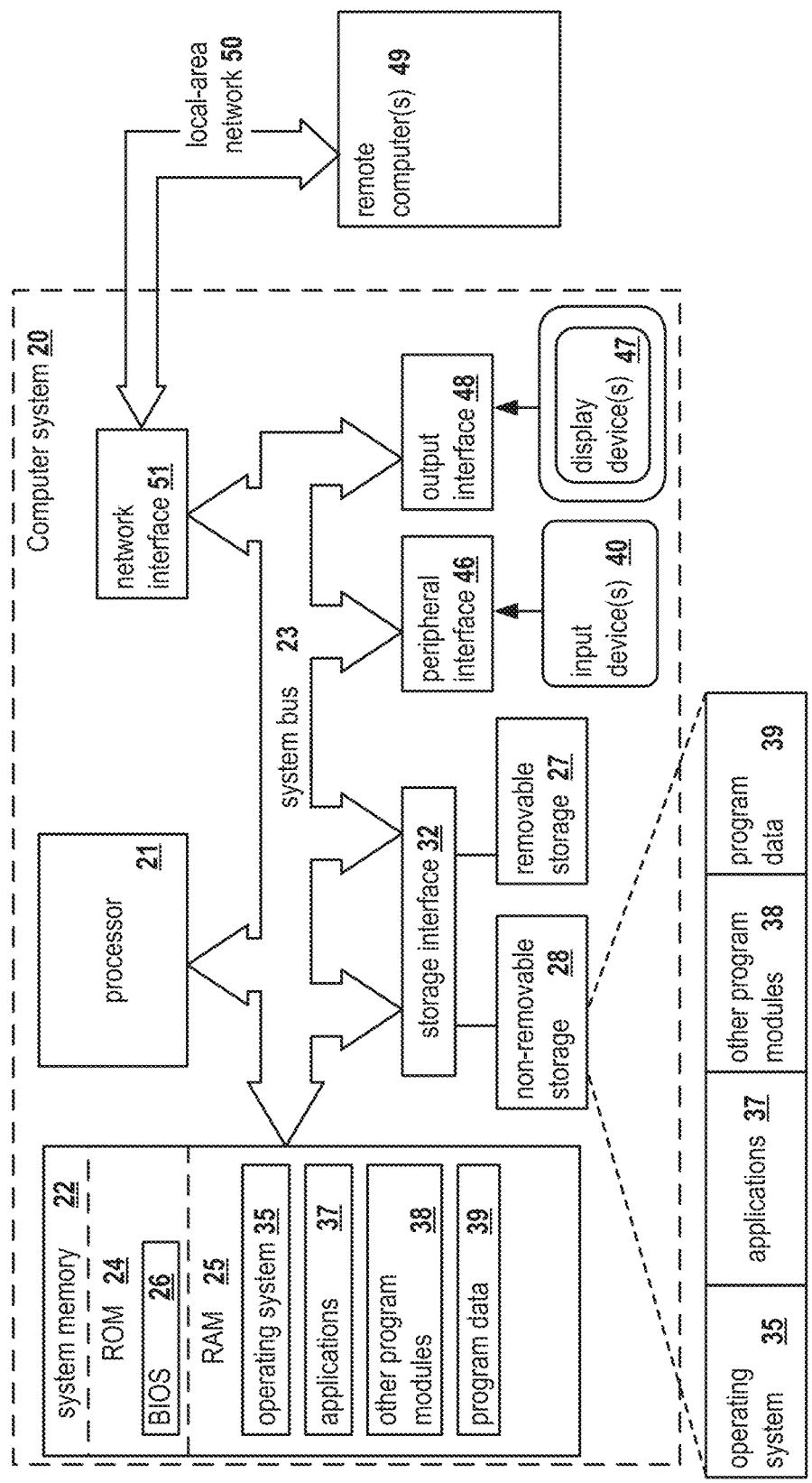
FIG. 7 is a block diagram illustrating a computer system on which aspects of systems and methods for controlling luminance during video production and broadcast may be implemented in accordance with an exemplary aspect.

FIG. 7 is a block diagram illustrating a computer system 20 on which aspects of systems and methods for controlling luminance during video production and broadcast may be implemented in accordance with an exemplary aspect. It should be noted that the computer system 20 can correspond to the any components of the system 100. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I$^2$C, and other suitable interconnects. The central processing unit 21 (also referred to as a processor) can include a single or multiple sets of processors having single or multiple cores. The processor 21 may execute one or more computer-executable codes implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 7, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed:

1. A system for controlling luminance of video content during video production, the system comprising:
    at least one camera configured to capture video content in a first imaging range;
    a histogram generator configured to measure a respective luminance level for each of a plurality of pixels in at least one frame of the captured video content, and to generate a luminance histogram based on the measured luminance levels of the plurality of pixels in the at least one frame;
    a first user interface configured to display the at least one frame of the captured video content and the generated luminance histogram as an overlay on the displayed at least one frame;
    a second user interface configured to display a light intensity curve relative to a plurality of parameters that include at least one of a standard dynamic range (SDR) reference range, an SDR peak white, a tonemap Max-Destination, a tonemap high dynamic range (HDR) range, and a hybrid log-gamma (HLG) monitor;
    a luminance controller configured to convert the captured video content in the first imaging range to broadcast video content in a second imaging range that is different than the first image range and has a luminance based on output luminance values of the light intensity curve; and
    a broadcast controller configured to encode the broadcast video content in the second imaging range for distribution to at least one content consuming device for display thereon,
    wherein the second user interface displays the plurality of parameters and is further configured to adjust the light intensity curve in response to a user adjustment of a value of at least one of the plurality of parameters to set the output luminance values for the luminance controller to convert the captured video content in the first imaging range to the broadcast video content in the second imaging range.

2. The system of claim 1, wherein the first imaging range is an HDR and the second imaging range is an SDR.

3. The system of claim 2, wherein the second user interface is configured to receive a selection of one or more of the following HDR to SDR conversion methodologies for converting the captured video content in the first imaging range to broadcast video content in the second imaging range: (1) High Mid-tone Detail Enhancement; (2) Highlight Detection; (3) Strong Highlight Enhancement; and (4) Gamut excursion correction.

4. The system of claim 1, wherein the captured video content is live video content.

5. The system of claim 1, wherein the plurality of parameters displayed in the second user interface include each of the SDR reference range, the SDR peak white, the tonemap Max-Destination, the tonemap HDR range, and the HLG monitor.

6. The system of claim 1, wherein the histogram generator is configured to generate the luminance histogram that includes 16 separate luminance ranges with a first range of the ranges beginning at less than 0.5 nits and a last range of the ranges being for pixels in the 8192-10000 nits range.

7. The system of claim 6, wherein the histogram generator is configured to generate the luminance histogram by pre-computing a one dimensional lookup table, wherein a key of the one dimensional lookup table is X bits.

8. A system for controlling luminance of video content during video production, the system comprising:
    at least one camera configured to capture video content in a first imaging range;
    a histogram calculator configured to evaluate luminance in the captured video content, and generate a luminance histogram for the captured video content;
    a user interface generator configured to:
        generate a first user interface displaying the captured video content overlaid with the generated luminance histogram, and
        generate a second user interface displaying a light intensity curve configured with parameters for converting the captured video content from the first imaging range into a second imaging range, with the parameters including at least one of a standard dynamic range (SDR) reference range, an SDR peak white, a tonemap Max-Destination, a tonemap high dynamic range (HDR) range, and a hybrid log-gamma (HLG) monitor; and
    a luminance controller configured to convert the captured video content into the second imaging range based on the parameters of the light intensity curve,
    wherein the second user interface displays the parameters and is further configured to adjust the light intensity curve in response to a user adjustment of a value of at least one of the parameters to control the luminance controller to convert the captured video content into the second imaging range.

9. The system of claim 8, further comprising a broadcast controller configured to encode the converted video content in the second imaging range for transmitting to one or more endpoint devices.

10. The system of claim 8, wherein the second user interface includes at least one control input configured adjust a position of the light intensity curve relative to the parameters to set output luminance values for the luminance controller to convert the captured video content in the first imaging range to the second imaging range.

11. The system of claim 8, wherein the first imaging range is an HDR and the second imaging range is an SDR.

12. The system of claim 11, wherein the second user interface is configured to receive a selection of one or more of the following HDR to SDR conversion methodologies for converting the captured video content in the first imaging range to broadcast video content in the second imaging range: (1) High Mid-tone Detail Enhancement; (2) Highlight Detection; (3) Strong Highlight Enhancement; and (4) Gamut excursion correction.

13. The system of claim 8, wherein the captured video content is live video content.

14. The system of claim 8, wherein the parameters displayed in the second user interface include each of the SDR reference range, the SDR peak white, the tonemap Max-Destination, the tonemap HDR range, and the HLG monitor.

15. The system of claim 8,
    wherein the histogram calculator is configured to generate the luminance histogram that includes 16 separate luminance ranges with a first range of the ranges beginning at less than 0.5 nits and a last range of the ranges being for pixels in the 8192-10000 nits range, and wherein the histogram calculator is configured to generate the luminance histogram by precomputing a one dimensional lookup table, wherein a key of the one dimensional lookup table is X bits.

16. The system of claim 8, wherein the luminance controller is further configured to dynamically adjust the second imaging range based on the parameters of the light intensity curve.

17. The system of claim 8, wherein the user interface generator is further configured to generate the first and second user interface based on endpoint device display information.

18. A system for setting luminance of video content, the system comprising:
a histogram generator configured to generate a luminance histogram based on measured luminance values for at least one region in video content in a first imaging range;
a user interface generator configured to generate at least one user interface configured to display the generated luminance histogram and a light intensity curve with associated parameters for converting the video content from the first imaging range to a second imaging range; and
a luminance controller configured to convert the video content to the second imaging range based on settings of the associated parameters of the light intensity curve,
wherein the at least one user interface is further configured to adjust a position of the light intensity curve in response to a user adjustment of a value of at least one of the associated parameters, and
wherein the parameters displayed in the at least one user interface include a standard dynamic range (SDR) reference range, an SDR peak white, a tonemap Max-Destination, a tonemap high dynamic range (HDR) range, and a hybrid log-gamma (HLG) monitor.

19. The system of claim 18, further comprising a broadcast controller configured to encode the converted video content in the second imaging range for transmitting to one or more endpoint devices.

20. The system of claim 18, wherein the first imaging range is an HDR and the second imaging range is an SDR.

21. The system of claim 20, wherein the at least one user interface is further configured to receive a selection of one or more of the following HDR to SDR conversion methodologies for converting the captured video content in the first imaging range to the second imaging range: (1) High Mid-tone Detail Enhancement; (2) Highlight Detection; (3) Strong Highlight Enhancement; and (4) Gamut excursion correction.

22. The system of claim 18, wherein the captured video content is live video content.

23. The system of claim 18,
wherein the histogram generator is configured to generate the luminance histogram that includes 16 separate luminance ranges with a first range of the ranges beginning at less than 0.5 nits and a last range of the ranges being for pixels in the 8192-10000 nits range, and
wherein the histogram calculator is configured to generate the luminance histogram by precomputing a one dimensional lookup table, wherein a key of the one dimensional lookup table is X bits.

24. The system of claim 18, wherein the luminance controller is further configured to dynamically adjust the second imaging range based on the parameters of the light intensity curve.

25. The system of claim 18, wherein the user interface generator is further configured to generate the at least one user interface based on endpoint device display information.

* * * * *